W. H. PARHAM.
WHEEL.
APPLICATION FILED MAY 15, 1907.
No. 899,611.
Patented Sept. 29, 1908.
2 SHEETS—SHEET 2.
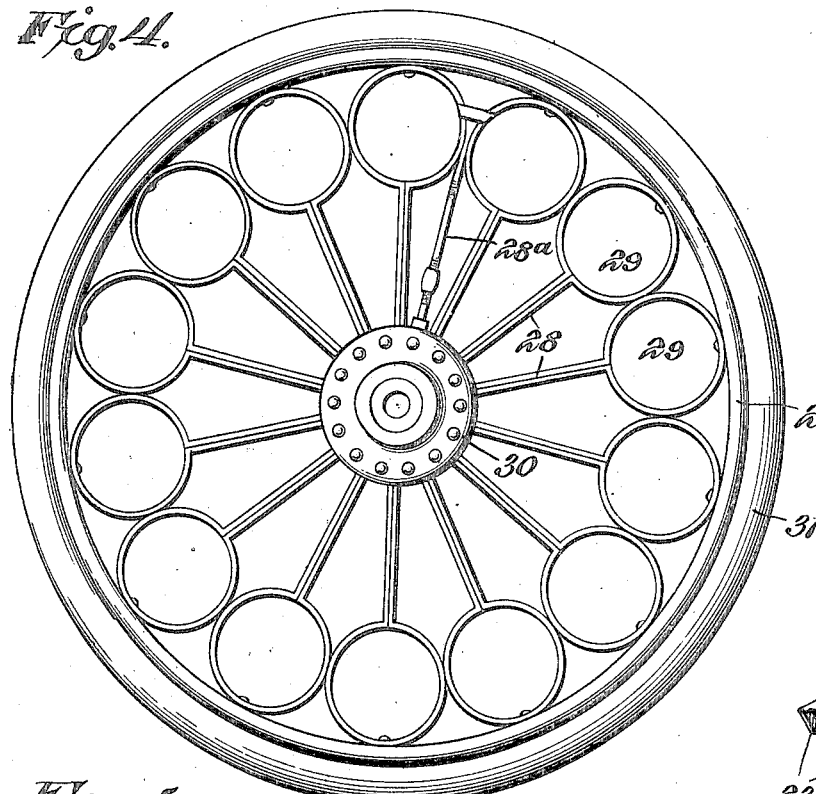
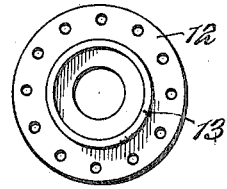
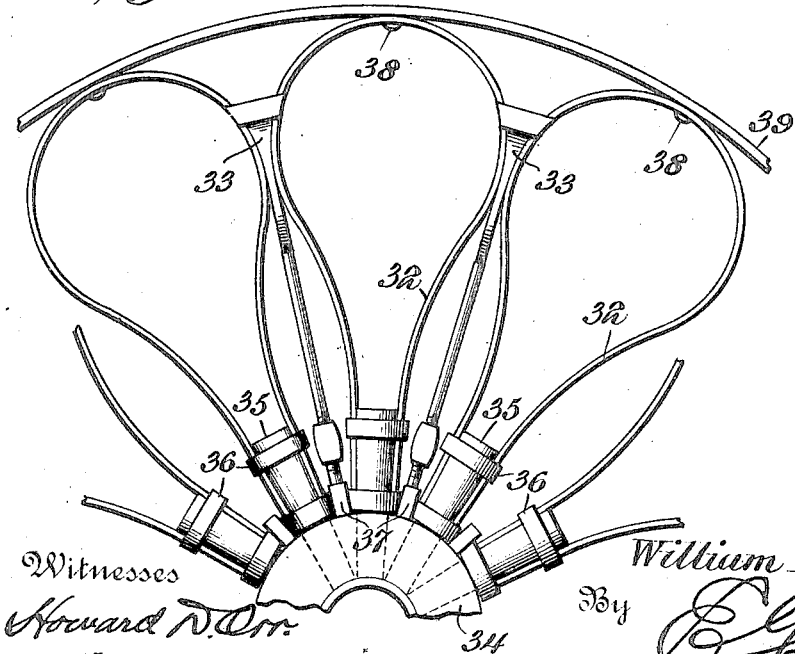
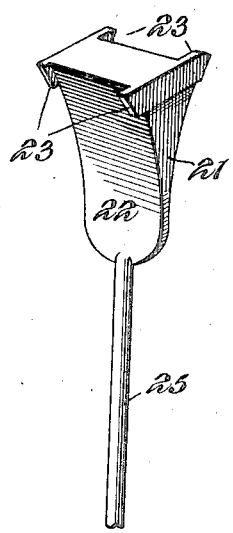
Witnesses
Howard N. Orr
H. F. Riley
Inventor,
William H. Parham,
By C. G. Siggers
Attorney

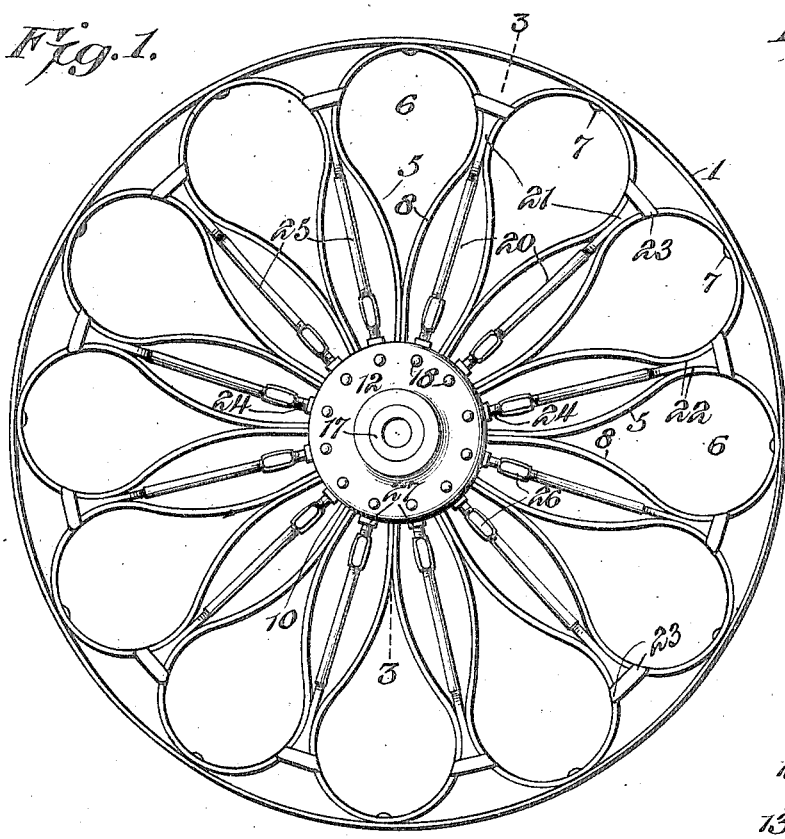
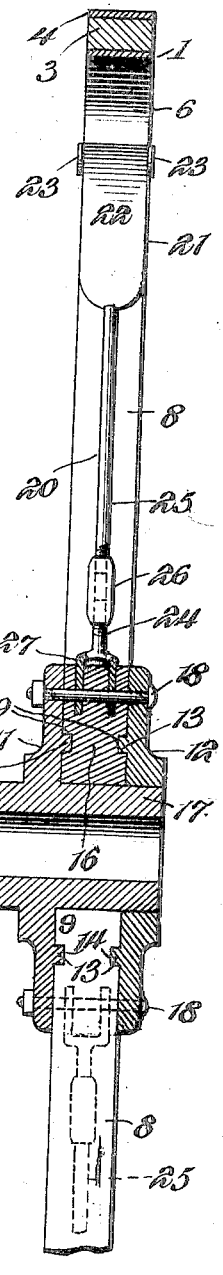
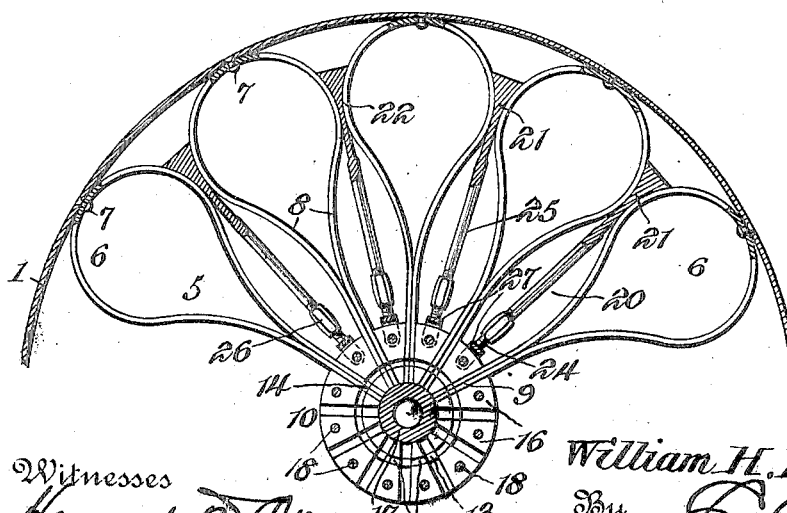

UNITED STATES PATENT OFFICE.

WILLIAM HENRY PARHAM, OF PADUCAH, KENTUCKY.

WHEEL.

No. 899,611.  Specification of Letters Patent.  Patented Sept. 29, 1908.

Application filed May 15, 1907. Serial No. 373,796.

*To all whom it may concern:*

Be it known that I, WILLIAM H. PARHAM, a citizen of the United States, residing at Paducah, in the county of McCracken and State of Kentucky, have invented a new and useful Wheel, of which the following is a specification.

The invention relates to improvements in wheels.

The object of the present invention is to improve the construction of wheels, and to provide a simple and highly resilient shock absorbing wheel of great strength and durability, designed for use on various kinds of vehicles, motor cars and the like, and adapted to afford the desired resiliency to adapt it for the use to which it is to be put, and capable of use in connection with any kind of tire.

A further object of the invention is to provide a wheel of this character, having means for enabling the resiliency to be adjusted to increase or diminish the same, as desired.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a mechanically resilient wheel, constructed in accordance with this invention and arranged to receive various forms of tires. Fig. 2 is a longitudinal sectional view of the hub and upper portion of the wheel. Fig. 3 is an enlarged transverse sectional view of a wheel, taken substantially on the line 3—3 of Fig. 1, the wheel being equipped with a wooden felly and a metallic tire for use on heavy vehicles. Fig. 4 is an elevation of a wheel, showing another form of spoke and equipped with a cushion tire. Fig. 5 is a side elevation of a portion of a wheel, showing the mechanically resilient device applied to the hub of an ordinary wheel. Fig. 6 is a detail view of one of the sections of the hub, showing the interior annular flange for interlocking the sections of the hub with the spokes and with the sector-shaped spacing blocks. Fig. 7 is a detail perspective view of the wedge-shaped head of one of the tension devices.

Like numerals of reference designate corresponding parts in all the figures of the drawings.

1 designates a metallic rim, adapted to receive any form of tire and designed to be constructed of any suitable material. The rim 1, shown in Figs. 1 to 3 inclusive of the drawings, is constructed of flat metal and is straight in cross section, but the wheel may be equipped with a rim 2, curved or concavo-convex in cross section to adapt it for the reception of a clencher tire, or a solid rubber tire or the like. In Fig. 3 of the drawings, the wheel is equipped with a wooden felly 3 and a metallic tire 4 for use on heavy vehicles.

The wheel, illustrated in Figs. 1 to 3 inclusive, is provided with an annular series of resilient spokes 5, constructed of suitable spring metal and provided with outer substantially elliptical loops 6, which are secured by bolts or rivets 7, or other suitable fastening devices to the inner face of the rim 1, but any other suitable means may be employed for retaining the outer portions of the spokes and the rim in place. Each spoke consists of a single strip of metal, and is provided with inwardly converging side portions 8, and the inner ends 9 of the spokes are fitted together, and are secured within a hub 10. The hub 10 is provided with sections 11 and 12, separable from each other and having interior annular flanges 13, which engage opposite notches 14 of the inner ends 9 of the spokes, whereby the latter are positively interlocked with the hub and are securely held between the sections thereof. The section 11 is integral with the hub 10, and the other section 12 is removed therefrom. The spokes are spaced apart at their inner ends by sector-shaped blocks 16 of wood, or other suitable material, and the end edges of the metal of the spokes abut against the tubular portion or axle box 17 of the hub section 11. The sections 11 and 12 of the hub are secured together by transverse bolts 18, which pierce the sections and the spacing blocks at points between the spokes, as clearly illustrated in Figs. 2 and 3 of the drawings. The bearing portion of the hub may be constructed in any desired manner to adapt the wheel to the vehicle, motor car, or the like on which it is to be used. The spacing blocks are provided at opposite sides with curved grooves 19 to receive the annular flanges 13 of the sections of the hub. Instead of providing the sections of the hub with annular flanges, the construction may be reversed, grooves being provided in the annular flanges and the spacing blocks, and the spokes having projecting lugs or flanges to interlock with the grooves. As this construction is obvious, illustration thereof is deemed unnecessary.

The resiliency of the wheel is adjusted by means of the tension devices 20, having wedge-shaped heads 21 interposed between the resilient loops 6 of the spokes and adjustably connected with the hub, whereby the heads 21 are adapted to be moved inwardly or outwardly to contract and stiffen the resilient spokes, or to permit the loops to expand and thereby increase the resiliency of the wheel. The heads 21, which are inwardly tapered, are provided with concave engaging faces 22 to fit the loops of the spokes, and they are provided at their outer ends with projecting lugs 23, arranged in pairs and engaging the side edges of the contiguous spokes to retain the sides of the loops in engagement with the tension devices.

The heads 21 are connected with the hub by adjustable rods or stems, composed of inner and outer sections 24 and 25 having their approximate terminals threaded for the reception of a turn-buckle 26. The inner sections of the tension devices are provided with forked portions 27, embedded in the wooden spacing blocks and secured to the same by the fastening devices 18, which pierce the sides of the forks. By adjusting the turn-buckle, the tapering head is moved inwardly or outwardly, and the adjusting means rigidly connects the tapered head with the hub. The tapered head may be moved inwardly from time to time to preserve the desired stiffness of the spokes. The loop-shaped spokes provide a highly elastic or resilient wheel, and while the wheel is adapted to dispense with pneumatic tires, it is also designed to coöperate with the same when desired.

The spokes may be provided with various forms of loops, and may be used with or without the tension device. In Fig. 4 of the drawings, the spokes 28 are provided with circular loops 29, riveted or otherwise secured to the rim 2 and having their inner ends interlocked with a hub 30, constructed similar to the hub 10 heretofore described. This form of wheel is also designed to be equipped with tension devices 28ᵃ, constructed in the same manner as those heretofore described, and having tapered or wedge-shaped heads interposed between the circular loops 29 and connected with the hub by adjustable stems. The wheel is equipped with a tire 31 of the clencher type.

In Fig. 5 of the drawings, the cushioning spokes 32 and the tension devices 33 are shown applied to a hub 34, having projecting portions 35 of the wooden spokes, the outer portions of the spokes having been cut off. The inner portions of the sides of the spokes are secured to the projecting portions 35 by bands 36, arranged in pairs, but any other suitable means may be employed for this purpose. The tension devices 35, which are similar in construction to the tension device 20, are secured to the hub, the forked portions 37 straddling the inner bands 36. The loops of the spokes 32 are secured by rivets 38, or other suitable fastening devices to a rim 39. The construction shown in Fig. 5 is adapted to readily convert an old wooden wheel into a resilient wheel without disturbing the special bearings of the vehicle or motor car, of which the wheel is a part.

Having thus fully described my invention, what I claim as new and desire to secure by Letters Patent, is:—

1. In a wheel of the class described, the combination of a rim, a hub, spokes secured to the hub and to the rim and including resilient loops, and tension devices movable radially of the wheel between the rim and the hub and connected to one of the said parts and engaging the loops of the spokes to vary the tension of the latter.

2. In a wheel of the class described, the combination of a rim, a hub, spokes secured to the hub and to the rim and including resilient loops, and tension devices connected with the hub of the wheel and fitted between and engaging the loops of the spokes and movable radially of the wheel to vary the tension of the said spokes.

3. In a wheel of the class described, the combination with a hub, and spokes having resilient loops, of a tension device provided with a tapered portion fitted between and engaging the loops and adjustable inwardly and outwardly to vary the tension of the same.

4. In a wheel of the class described, the combination with a hub, and spokes having resilient loops, of a tension device provided with a tapered portion fitted between and engaging the loops and adjustable inwardly and outwardly to vary the tension of the same, said tapered portion being provided with opposite lugs spaced apart to receive the loops.

5. In a wheel of the class described, the combination with a hub, and spokes provided with resilient loops, of a tension device composed of a tapered portion fitted between and engaging the loops, and means for adjustably connecting the tapered portion with the hub for moving the tapered portion inwardly and outwardly.

6. In a wheel of the class described, the combination with a hub, and spokes provided with resilient loops, of a tension device composed of a tapered portion fitted between and engaging the loops, and adjustable means forming a rigid connection between the tapered portion and the hub and adapted to move the former inwardly and outwardly.

7. In a wheel of the class described, the combination of a rim, a hub, spokes secured to the hub and having outer resilient loops secured to the rim, and tension devices interposed between the spokes and composed of inwardly tapered heads having concave side faces to engage the loops of the spokes and provided with spaced projecting portions to receive the loops, and adjustable stems rigidly connecting the heads with the hub.

In testimony, that I claim the foregoing as my own, I have hereto affixed my signature in the presence of two witnesses.

WILLIAM HENRY PARHAM.

Witnesses:
 AUBER SMITH,
 B. E. HART.